United States Patent [19]
Kobayashi et al.

[11] 3,885,003
[45] May 20, 1975

[54] INTAKE SYSTEM FOR AN INTERNAL COMBUSTION ENGINE

[75] Inventors: Kazuaki Kobayashi; Tatsujiro Okuno; Shinya Katayama; Takehiko Kita, all of Tokyo, Japan

[73] Assignee: Nissan Motor Company Limited, Japan

[22] Filed: Feb. 6, 1974

[21] Appl. No.: 439,982

[30] Foreign Application Priority Data
Feb. 7, 1973 Japan.............................. 48-16937

[52] U.S. Cl.............................. 261/23 A; 123/8.13
[51] Int. Cl........................................... F02m 11/02
[58] Field of Search .......... 261/23 A; 123/8.13, 127

[56] References Cited
UNITED STATES PATENTS

| | | | |
|---|---|---|---|
| 2,890,030 | 6/1959 | Gordon............................ | 261/23 A |
| 3,168,077 | 2/1965 | Froede............................ | 123/8.13 |
| 3,759,493 | 9/1973 | Blanchard et al................ | 261/23 A |
| 3,780,707 | 12/1973 | Cole................................ | 123/8.13 |

Primary Examiner—Tim R. Miles
Attorney, Agent, or Firm—Robert E. Burns; Emmanuel J. Lobato; Bruce L. Adams

[57] ABSTRACT

An intake system for an internal combustion engine comprises a primary throttle valve disposed in a primary combustible mixture intake passageway, a check valve disposed in the primary intake passageway near an intake port of the engine, a secondary throttle valve disposed in a secondary combustible mixture intake passageway near an intake port of the engine and operatively connected to the primary throttle valve, an auxiliary throttle valve disposed in the second intake passageway upstream of the secondary throttle valve and actuated to open the secondary intake passageway in response to combustible mixture acting on the surface of the auxiliary throttle valve, and a fuel port opening into the secondary intake passageway at a position where the auxiliary throttle valve closes the secondary intake passageway whereby the secondary and auxiliary throttle valves are opened to supply the engine with additional combustible mixture at a desired or optimum timing when the primary throttle valve is opened a predetermined amount.

4 Claims, 5 Drawing Figures

INTAKE SYSTEM FOR AN INTERNAL COMBUSTION ENGINE

The present invention relates to an internal combustion engine and, more particularly, to an intake system of an internal combustion engine such as a rotary engine equipped with a twin-barrel carburettor which requires a relatively great overlap of the openings of intake and exhaust valves.

Figure 1:
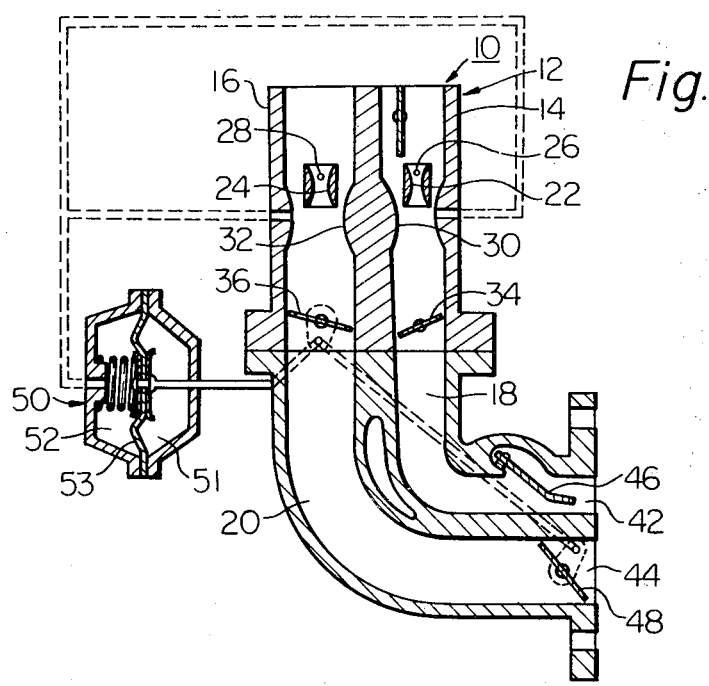
FIG. 1 is a schematic cross-sectional view of an example of a conventional intake system for an internal combustion engine.

Referring now to FIG. 1, a conventional intake system 10 for an internal combustion engine (not shown) is shown to comprise a twin-barrel carburettor 12 having primary and secondary sections 14 and 16 communicating with intake ports (not shown) of the engine through primary and secondary intake passageways 18 and 20 extending through the primary and secondary sections 14 and 16, respectively. The primary and secondary sections 14 and 16 have primary and secondary inner venturi sections 22 and 24 formed in the primary and secondary intake passageways 18 and 20 and into which primary and secondary main fuel nozzles 26 and 28 open, primary and secondary outer venturi sections 30 and 32 formed downstream of the primary and secondary inner venturi sections 22 and 24, and primary and secondary throttle valves 34 and 36 movably mounted downstream of the primary and secondary outer venturi sections 30 and 32, respectively. The primary and secondary intake passageways 18 and 20 have provided therein near outlet ports 42 and 44 a check valve 46 and an auxiliary throttle valve 48, respectively for preventing burned gases or combustible mixture in engine combustion chamber (not shown) from flowing backward toward the carburettor 12 through the primary and secondary intake passageways 18 and 20 and preventing the engine from unsmoothly rotating. A diaphragm unit 50 is provided for operating the secondary throttle valve 36. The diaphragm unit 50 has an atmospheric chamber 51 vented to the atmosphere, a vacuum chamber 52 communicating with the primary and secondary outer venturi sections 30 and 32 and a flexible diaphragm 53 separating the atmospheric chamber 51 from the vacuum chamber 52 and operatively connected to the secondary throttle valve 36. The auxiliary throttle valve 48 is mechanically interlocked with the secondary throttle valve 36 so that it is opened as the secondary throttle valve 36 is opened by the diaphragm 53 of the diaphragm unit 50 operated in response to a vacuum developing in the primary outer venturi section 30 after the primary throttle valve 34 is opened a predetermined amount. During slight openings of the secondary and auxiliary throttle valves 36 and 48, the amount of air flowing in the secondary intake passageway 20 toward the engine is insufficient to produce a vacuum in the secondary inner venturi section 24 to draw fuel from the secondary main fuel nozzle 28. Thus, air alone is fed into the engine from the secondary section 16 of the carburettor 12 to dilute combustible mixture fed into the engine from the primary section 14. This results in a lowering in the engine power output. Moreover, a vacuum in the primary outer venturi section 30 is required to open the auxiliary throttle valve 48 in addition to the secondary throttle valve 36. The diaphragm 53 cannot open the secondary throttle valve 36 when the vacuum develops insufficient to operate the diaphragm 53 even if the primary throttle valve 34 is opened a predetermined amount at which the secondary throttle valve 36 is to be opened.

Figure 2:
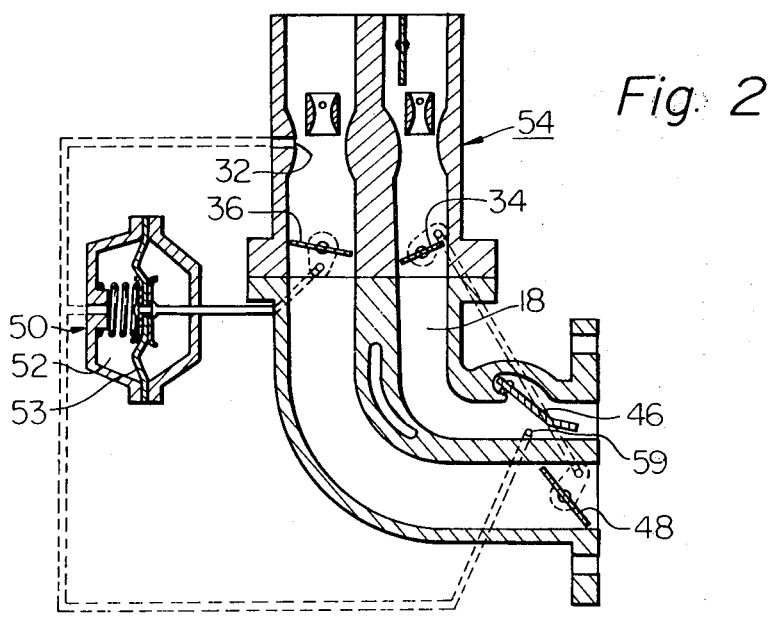
FIG. 2 is a schematic cross-sectional view of another example of a conventional intake system for an internal combustion engine.

Referring now to FIG. 2, there is shown another conventional intake system 54 for an internal combustion engine (not shown). Like component parts are designated by the same reference numerals as those of FIG. 1. The intake system 54 is different from the intake system 10 shown in FIG. 1 in that a vacuum chamber 52 of a diaphragm unit 50 communicates with a primary intake passageway 18 immediately upstream of a position where a check valve 46 closes the passageway 18 as shown at a point 59 in FIG. 2 and with a secondary outer venturi section 32 and in that an auxiliary throttle valve 48 is mechanically interlocked with a primary throttle valve 34. Although a flexible diaphragm 53 of the diaphragm unit 50 is operated by a vacuum downstream of the primary throttle valve 34 greater than that upstream thereof and the vacuum is not required to open the auxiliary throttle valve 48 in addition to a secondary throttle valve 36, the diaphragm 53 cannot open the secondary throttle valve 36 when a vacuum in the primary intake passageway 18 develops insufficiently to operate the diaphragm 53 even if the primary throttle valve is opened a predetermined amount to open the auxiliary throttle valve 48, as far as a diaphragm unit responsive to the difference between the atmospheric pressure and a vacuum in the primary intake passageway 18 is employed for actuation of the secondary throttle valve 36.

The invention contemplates to provide an intake system for an internal combustion engine which has no shortcomings as mentioned above.

Figure 3:
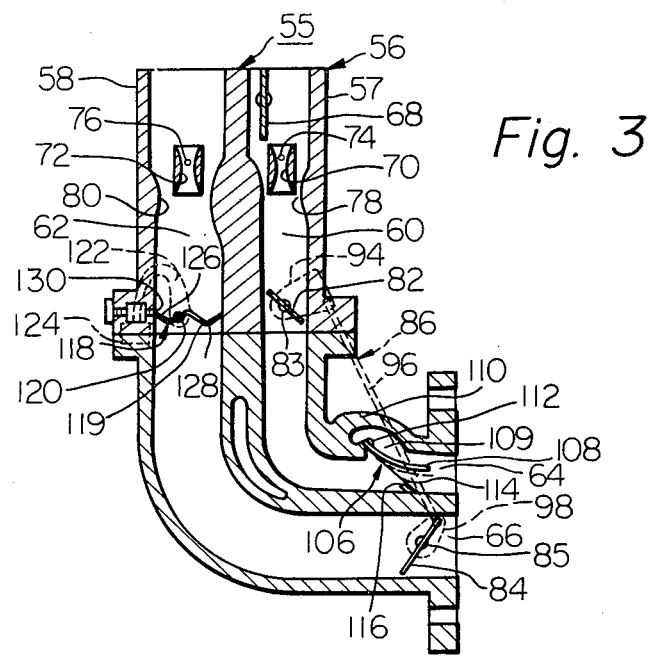
FIG. 3 is a schematic cross-sectional view of a preferred embodiment of an intake system according to the invention for an internal combustion engine.
Figure 4:
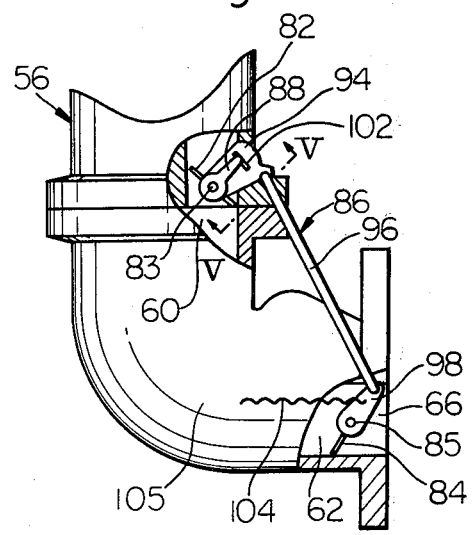
FIG. 4 is a side view, partly in cross section, of the intake system shown in FIG. 3.
Figure 5:
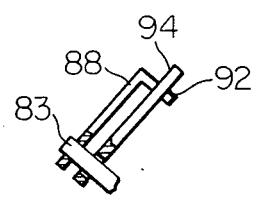
FIG. 5 is an enlarged side view, partly in cross section, taken substantially along a line V—V of FIG. 4.

Referring now to FIGS. 3 and 4, there is shown a preferred embodiment of an intake system 55 according to the invention for an internal combustion engine (not shown). The intake system 55 comprises a twin-barrel carburettor 56 including primary and secondary sections 57 and 58 and primary and secondary intake passageways 60 and 62 extending through the primary and secondary sections 57 and 58 and vented to the atmosphere through an engine air cleaner (not shown) and communicating through outlet ports 64 and 66 with intake ports (not shown) of the engine, respectively. The carburettor 56 has a choke valve 68 movably mounted in the primary intake passageway 60, primary and secondary inner venturi sections 70 and 72 formed in the primary and secondary intake passageways 60 and 62 and into which primary and secondary main fuel nozzles 74 and 76 open, respectively, primary and secondary outer venturi sections 78 and 80 formed downstream of the primary and secondary inner venturi sections 70 and 72, respectively, and a primary throttle valve 82 movably disposed downstream of the primary outer venturi section 78 and fixedly mounted on a rotatable shaft 83. The choke valve 68 is automatically operable to normally open the primary intake passageway 60 and to close the passageway 60 during cold or warm-up operation of the engine. The primary and secondary main fuel nozzles 74 and 76 communicate with a float chamber (not shown). The primary throttle valve 82 is connected through a linkage (not shown) to an accelerator pedal (not shown) of a motor vehicle equipped with the engine and is manually operable to control the flow of combustible mixture passing through the primary intake passageway 60 in accordance with the torque or load demands of the engine. A secondary throttle valve 84 is fixedly mounted on a rotatable shaft 85 and is movably disposed in the secondary intake passageway 62 near the outlet port 66. The secondary throttle valve 84 is mechanically interlocked with the primary throttle valve 82 through a linkage 86 located externally of the primary and secondary intake passageways 60 and 62. The linkage 86 includes a first lever 88 fixedly mounted at one end thereof on the shaft 83 of the primary throttle valve 82 and having formed thereon a flange or extension 92 which is normal to the surface of the first lever 88 as shown in FIG. 5, a plate 94 pivotally connected at one end thereof to the shaft 83 of the primary throttle valve 82, a rod 96 pivotally connected at one end thereof to the other end of the plate 94, and a second lever 98 pivotally connected at one end thereof to the other end of the rod 96 and fixedly mounted at the other end thereof on the shaft 85 of the secondary throttle valve 84. The plate 94 has formed therein a slot 102 into which the extension 92 of the first lever 88 is movably inserted and which is elongate in the direction of rotational movement of the extension 92. The secondary throttle valve 84 is held in its closed position to fully close the secondary intake passageway 62 to prevent burned gases or combustible mixture in the engine from being forced toward the carburettor 56, when the primary throttle valve 82 is closed and is opened below a predetermined amount. The plate 94 is rotated on the shaft 83 by the first lever 88 to turn the secondary throttle valve 84 from its closed position in open direction to open the secondary intake passageway 62 when the primary throttle valve 82 is opened in excess of a predetermined amount. The secondary throttle valve 84 is adapted to fully open the secondary intake passageway 62 when the primary throttle valve 82 fully opens the primary intake passageway 60. The secondary throttle valve 84 is biased to its closed position to fully close the secondary intake passageway 62 by biasing means such as a tension spring 104 secured at one end thereof to an external wall 105 of the primary secondary intake passageways 60 and 62 and at the other end thereof to the second lever 98. A check valve or reed valve 106 is disposed in the primary intake passageway 60 near the outlet port 64. The check valve 106 includes a stop or valve retainer 108 fixedly mounted at one end thereof in a recess 109 formed in a body 110 through suitable fastening means such as a screw 112 and extending into the primary intake passageway 60 and curved toward the outlet port 64 to extend in the longitudinal direction of the primary intake passageway 60, a valve plate 114 having one free end and fixedly mounted at the other end thereof on the valve retainer 108 and seatable on the valve retainer when the valve plate opens the primary intake passageway 60, and a valve seat 116 formed on an internal wall of the primary intake passageway 60 and on which the valve plate 114 is seatable at the free end thereof when the valve plate closes the primary intake passageway 60. The valve retainer 108 serves to restrict the valve plate 114 to be excessively deformed toward the outlet port 64. The valve plate 114 is made of a pliable material which may be metal and is deformable in response to the difference between the pressures in the primary intake passageway 60 acting on both sides of the valve plate 114 as a result of movement of a working member (not shown) of the engine. When the pressure acting on the carburettor side of the valve plate 114 is below that acting on the engine side thereof, the valve plate 114 is forced against the valve seat 116 to close the primary intake passageway 60 to prevent combustible mixture or burned gases in the engine from flowing backward toward the carburettor 56. When the pressure acting on the carburettor side of the valve plate 114 is higher than that acting on the engine side thereof, the valve plate 114 is pulled toward the valve retainer 108 and is deformed away from the valve seat 116 to open the primary intake passageway 60 to allow combustible mixture from the carburettor 56 to flow into the engine. A damper valve or auxiliary throttle valve 118 is disposed in the secondary intake passageway 62 downstream of the secondary outer venturi section 80. The damper valve 118 includes a valve member 119 fixedly mounted on a rotatable shaft 120 located at a position deviating from the center of the secondary intake passageway 62, and a generally U-shaped arm 122 fixedly mounted at one end thereof on the shaft 120 and located externally of the secondary intake passageway 62. The valve member 119 is biased into its closed position to close the secondary intake passageway 62 as shown in FIG. 3 by a weight 124 mounted on the other end of the arm 122 and can be held in the closed position by suitable means such as a stop (not shown) receiving the weight 124. The valve member 119 is opened by the pressure of combustible mixture flowing in the secondary intake passageway 62 toward the engine and acting on the difference between smaller and larger surface areas 126 and 128 of the valve member 119 which is opposite to the bias of the weight 124. The degree of opening of the valve member 119 depends on the weight 124, the degree of opening of the secondary throttle valve 84 or the amount of combustible mixture flowing in the secondary intake passageway 62 toward the engine, and the difference of the smaller and larger surface areas 126 and 128 of the valve member 119. Thus, the damper valve 118 can be securely actuated to open the secondary intake passageway 62 at any time when the secondary throttle valve 84 is opened by the primary throttle valve 82 opened a predetermined amount, by selecting the weight 124 and the difference of the surface areas 126 and 128 at suitable values. A secondary fuel port 130 opens into the secondary intake passageway 62 at a position where the valve element 119 of the damper valve 118 closes the passageway 62. The secondary fuel port 130 communicates with a source (not shown) of fuel or combustible mixture and fuel or combustible mixture is fed into the secondary intake passageway 62 when air passing through the secondary inner venturi section 72 is insufficient to draw fuel from the secondary main fuel nozzle 76 into the venturi section 72 during a slight opening of the auxiliary throttle valve 118.

It will be understood that an auxiliary throttle valve can be securely opened to feed additional combustible mixture having an optimum or desired air-fuel ratio to the engine from a secondary section of a twin-barrel carburettor at an optimum or desired timing when a primary throttle valve is opened a predetermined amount to open a secondary throttle valve, since the secondary throttle valve is opened by actuation of the primary throttle valve and that auxiliary throttle valve is opened in response to combustible mixture acting on the carburettor side of a valve element of the auxiliary throttle valve which flows in a secondary intake passageway toward an engine and combustible mixture is supplied into the secondary intake passageway from a fuel port opening thereinto immediately downstream of the auxiliary throttle valve during a slight opening of the auxiliary throttle valve.

What is claimed is:

1. An intake system for an internal combustion engine, comprising primary and secondary combustible mixture intake passageways providing communication between the atmosphere and said engine, a primary throttle valve movably disposed in said primary intake passageway, a check valve disposed in said primary intake passageway downstream of said primary intake passageway and near said engine and opening said primary intake passageway only when the pressure on the engine side of said check valve is below that on the opposite side thereof, a secondary throttle valve disposed in said secondary intake passageway near said engine and operatively connected through a linkage to said primary throttle valve to be actuated to open said secondary intake passageway when said primary throttle valve is opened in excess of a predetermined amount, an auxiliary throttle valve disposed in said secondary intake passageway upstream of said secondary throttle valve and actuated to open said secondary intake passageway in response to combustible mixture acting on the surface area of said auxiliary throttle valve, and a fuel port opening into said secondary intake passageway at a position where said auxiliary throttle valve closes said secondary intake passageway.

2. An intake system as claimed in claim 1, in which said linkage comprises a first lever fixedly mounted on a shaft of said primary throttle valve and having formed thereon an extension projecting from the plane of said first lever, a plate pivotally mounted on said shaft of said primary throttle valve and having formed therein a slot into which said extension of said first lever is movably inserted, a rod pivotally connected at one end thereof to said plate, and a second lever pivotally connected to the other end of said rod and fixedly mounted on a shaft of said secondary throttle valve.

3. An intake system as claimed in claim 1, in which said check valve comprises a valve retainer extending into said primary intake passageway and curved toward said engine, a valve plate having one free end and mounted at the other end thereof on said valve retainer, said valve plate being seatable on said retainer when said valve plate opens said primary intake passageway, and a valve seat formed in said primary intake passageway, said valve plate being seatable at said free end thereof on said valve seat when said valve plate closes said primary intake passageway.

4. An intake system as claimed in claim 1, in which said auxiliary throttle valve comprises a rotatable shaft disposed in said secondary intake passageway at a position deviating from the center thereof, a valve member disposed in said secondary intake passageway and fixedly mounted on said shaft, an arm fixedly mounted at one end thereof on said shaft, and a weight fixedly mounted on the other end of said arm.

* * * * *